US009817881B2

(12) United States Patent
Bapat et al.

(10) Patent No.: US 9,817,881 B2
(45) Date of Patent: Nov. 14, 2017

(54) HIDDEN MARKOV MODEL PROCESSING ENGINE

(71) Applicant: Cypress Semiconductor Corporation, San Jose, CA (US)

(72) Inventors: Ojas A. Bapat, Sunnyvale, CA (US); Richard M. Fastow, Cupertino, CA (US); Jens Olson, Saratoga, CA (US); Kenichi Kumatani, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 239 days.

(21) Appl. No.: 14/054,884

(22) Filed: Oct. 16, 2013

(65) Prior Publication Data
US 2015/0106405 A1     Apr. 16, 2015

(51) Int. Cl.
*G10L 15/14*   (2006.01)
*G06F 17/30*   (2006.01)
*G10L 15/30*   (2013.01)

(52) U.S. Cl.
CPC .. *G06F 17/30587* (2013.01); *G06F 17/30536* (2013.01); *G10L 15/14* (2013.01); *G10L 15/142* (2013.01); *G10L 15/30* (2013.01)

(58) Field of Classification Search
CPC ........ G10L 15/14; G10L 15/142; G10L 15/30
See application file for complete search history.

(56) References Cited

U.S. PATENT DOCUMENTS

| | | | | | |
|---|---|---|---|---|---|
| 4,977,598 | A | * | 12/1990 | Doddington | G10L 15/14 704/255 |
| 5,526,444 | A | * | 6/1996 | Kopec | G06K 9/00 382/209 |
| 5,710,865 | A | * | 1/1998 | Abe | G10L 15/04 704/248 |
| 5,745,600 | A | * | 4/1998 | Chen | G06K 9/72 382/218 |
| 5,806,034 | A | * | 9/1998 | Naylor | G10L 15/144 704/238 |
| 5,825,921 | A | * | 10/1998 | Dulong | G06K 9/6297 382/181 |
| 6,230,128 | B1 | * | 5/2001 | Smyth | G10L 15/08 704/231 |
| 6,285,981 | B1 | * | 9/2001 | Kao | G10L 15/142 704/231 |

(Continued)

OTHER PUBLICATIONS

Pending Application, U.S. Appl. No. 13/725,260, inventors Fastow et al., filed Dec. 21, 2012 (Not Published).

*Primary Examiner* — Paras D Shah
*Assistant Examiner* — Bryan Blankenagel

(57) ABSTRACT

A method, apparatus, and tangible computer readable medium for processing a Hidden Markov Model (HMM) structure are disclosed herein. For example, the method includes receiving Hidden Markov Model (HMM) information from an external system. The method also includes processing back pointer data and first HMM states scores for one or more NULL states in the HMM information. Second HMM state scores are processed for one or more non-NULL states in the HMM information based on at least one predecessor state. Further, the method includes transferring the second HMM state scores to the external system.

19 Claims, 16 Drawing Sheets

(56) References Cited

U.S. PATENT DOCUMENTS

| | | | | |
|---|---|---|---|---|
| 6,374,222 B1* | 4/2002 | Kao | G10L 15/08 | 704/241 |
| 6,490,555 B1* | 12/2002 | Yegnanarayanan | G10L 15/144 | 704/231 |
| 6,678,415 B1* | 1/2004 | Popat | G06K 9/72 | 382/226 |
| 6,801,656 B1* | 10/2004 | Colmenarez | G06K 9/00335 | 382/159 |
| 2002/0165717 A1* | 11/2002 | Solmer | G06F 17/2775 | 704/256.4 |
| 2003/0182113 A1* | 9/2003 | Huang | G10L 15/30 | 704/231 |
| 2005/0154589 A1* | 7/2005 | Nishitani | G10L 15/144 | 704/256 |
| 2005/0209851 A1* | 9/2005 | Shu | G10L 15/142 | 704/246 |
| 2005/0234906 A1* | 10/2005 | Ganti | G06F 17/30569 | |
| 2008/0059188 A1* | 3/2008 | Konopka | G10L 15/22 | 704/257 |
| 2009/0222266 A1* | 9/2009 | Sakai | G10L 15/063 | 704/254 |
| 2009/0271581 A1* | 10/2009 | Hinrichs, Jr. | G06F 11/1441 | 711/162 |
| 2011/0208521 A1* | 8/2011 | McClain | G10L 15/142 | 704/233 |
| 2011/0288835 A1* | 11/2011 | Hasuo | G06K 9/6297 | 703/2 |
| 2012/0057775 A1* | 3/2012 | Suzuki | H04N 5/76 | 382/154 |
| 2012/0071891 A1* | 3/2012 | Itkowitz | A61B 19/2203 | 606/130 |
| 2013/0138589 A1* | 5/2013 | Yu | G06N 3/08 | 706/25 |

* cited by examiner

| |
|---|
| DATA_LENGTH |
| <HMM> (one per HMM) {HMM_ID, NUM_STATES, BEST_SCR, <STATE>_PTR, <OBS_PROB>, <PATH>_PTR, <STATE_TYPE_FLAGS>} |
| <STATE> (one per HMM state) {CURR_SCR, BKPTR, OBS_PROB_ID} |
| <OBS_PROB> (one per HMM state) {OBS_PROB} |
| <PATH> (one per HMM state) {NUM_PRED, <PATH_INFO>} |
| <PATH_INFO> (one per pred state) {PRED_STATE_PTR, TRANS_PROB} |
| <STATE_TYPE_FLAGS> {One bit per state; 1=Emitting 0=Non-emitting} |

DATA_LENGTH 40 ~610

<HMM> {1234, 3, 25, st_ptr1, st_ptr2, st_ptr3, 732, 481, 536, path_ptr1, path_ptr2, path_ptr3, 111 (flags), byte aligned} ~620 st_ptr1 {26, 1211, ob-prob1} ~630 st_ptr2 {455, 1255, ob-prob2} ~640 st_ptr3 {62, 1406, ob-prob3} ~650 path_ptr1 {2, st_ptr1, 456, NULL, 106} ~660 path_ptr2 {2, st_ptr1, 333, st_ptr2, 222} ~670 path_ptr3 {2, st_ptr2, 111, st_ptr3, 501} ~680

HIDDEN MARKOV MODEL PROCESSING ENGINE

BACKGROUND

Field

Embodiments included herein generally relate to the processing of Hidden Markov Models (HMMs). More particularly, embodiments relate to a processing engine configured to process different types of HMM structures.

Background

Hidden Markov Models (HMMs) are used in many applications such as, for example, speech recognition, text-to-speech applications, handwriting recognition, gesture recognition, bioinformatics, and cryptanalysis. These applications can implement different types of HMM structures such as, for example, Ergodic models, left-to-right models, and parallel path left-to-right models. Each of these HMM models includes one or more states, in which a score can be attributed to each HMM model based on its respective one or more states.

For example, a probability can be computed to assess whether a particular HMM model produces an observed sequence of states. Here, a score can be attributed to how well the particular HMM model matches the observed sequence of states. The score can be calculated by enumerating every possible state sequence in the HMM model. For HMM models with a high number of states and/or a complex structure, this can be a computationally-intensive process. This issue is further exacerbated by the limitation of HMM processing engines being only capable of handling one type of HMM structure (e.g., Ergodic HMM structure, left-to-right HMM structure, or parallel path left-to-right HMM structure), thus limiting the implementation of the HMM processing across different HMM applications.

SUMMARY

Therefore, there is a need for an HMM processing engine configured to efficiently process different types of HMM structures.

An embodiment includes a method for processing an HMM data structure. The method includes receiving Hidden Markov Model (HMM) information from an external system. The method also includes processing back pointer data and first HMM state scores for one or more NULL states in the HMM information. Second HMM state scores are updated for one or more non-NULL states in the HMM information based on at least one predecessor state. Further, the method includes transferring the second HMM state scores to the external system.

Another embodiment includes an apparatus for processing an HMM data structure. The apparatus includes a state type fetch module, a processing module, and an output list module. The state type fetch module is configured to determine a presence of one or more NULL and non-NULL states in HMM information. The processing module is configured to process back pointer data and first HMM state scores for the one or more NULL states and process second HMM states scores for one or more non-NULL states based on at least one predecessor state. The processing module is also configured to update the back pointer data based on the HMM information associated with the one or more non-NULL states. Further, the output list module is configured to transfer the updated back pointer data and second HMM state scores to an external system.

A further embodiment includes a tangible computer readable medium having stored therein one or more sequences of one or more instructions for execution by one or more processors to perform a method for processing a Hidden Markov Model (HMM) structure. The method includes receiving Hidden Markov Model (HMM) information from an external system. The method also includes processing back pointer data and first HMM state scores for one or more NULL states in the HMM information. Second HMM state scores are updated for one or more non-NULL states in the HMM information based on at least one predecessor state. Further, the method includes transferring the second HMM state scores to the external system.

Further features and advantages of the embodiments disclosed herein, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to a person skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the embodiments and to enable a person skilled in the relevant art to make and use the invention.

FIG. 3 is an illustration of an embodiment of a Hidden Markov Model (HMM) data structure.

FIG. 6 is an illustration of an example complete Hidden Markov Model (HMM) data structure, according to an embodiment.

Figure 1:
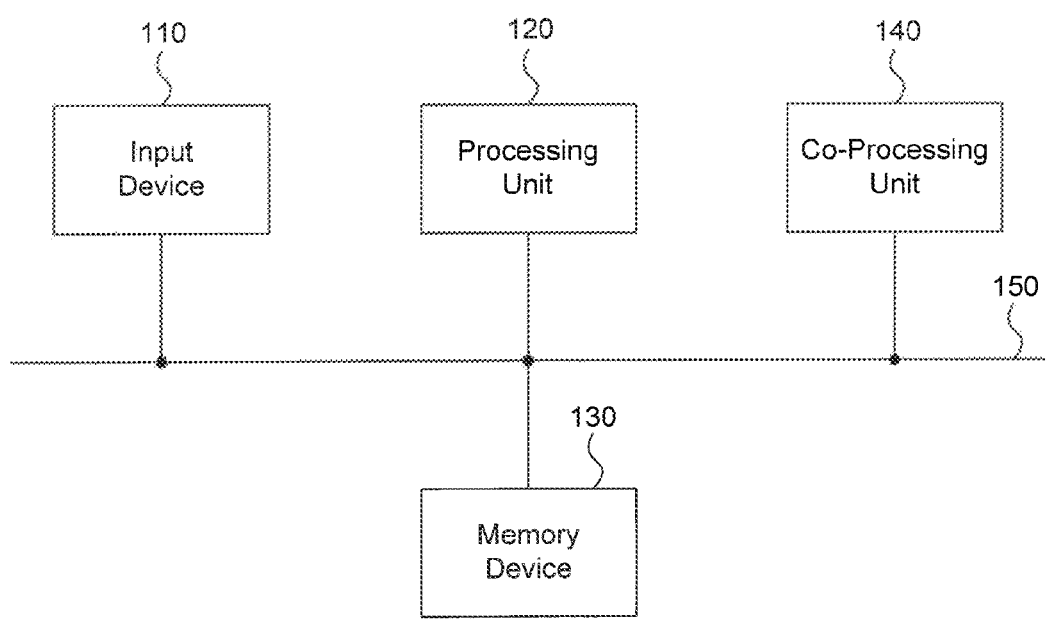
FIG. 1 is an illustration of an example system in which example embodiments, or portions thereof, can be implemented.

Embodiments will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

1. Example System

FIG. 1 is an illustration of an example system 100 in which embodiments, or portions thereof, can be implemented. System 100 includes an input device 110, a processing unit 120, a memory device 130, a co-processing unit 140, and a data bus 150. Input device 110, processing unit 120, memory device 130, and co-processing unit 140 can be separate physical components (e.g., separate chips) configured to communicate with one another over data bus 150. Alternatively, processing unit 120 and co-processing unit 140 can be integrated in the same physical component (e.g., chip), which communicates with input device 110 and memory device 130 over data bus 150. Memory device 130 can be, for example, a Dynamic Random Access Memory (DRAM) device that is external to both processing unit 120 and co-processing unit 140 and in communication with processing unit 120 and co-processing unit 140 via data bus 150. Input device 110 is in communication with processing unit 120 and/or co-processing unit 140 via data bus 150. Data bus 150 can have a bus width that is dependent on the type of application executed by processing unit 120 and/or co-processing unit 140 (e.g., 8-, 16-, 32-, 64-, 128-, 256-, 512-, 1024-bits).

Input device 110 is configured to receive an incoming signal such as, for example, an incoming voice signal, video signal, multi-media signal, non-visible light signals, handwritten text, or a signal of any kind representative of a gesture. Input device 110 can convert the incoming signal to a digitally-formatted signal and transfer the digitally-formatted signal to processing unit 120 and/or co-processing unit 140 for further processing. For example, if the incoming signal is a voice signal, input device 110 can convert acoustical vibrations associated with the incoming voice signal to an analog signal. Input device 110 can further digitize the analog signal using an analog-to-digital converter (not shown in FIG. 1), and the resulting digitally-formatted signal can be transferred to processing unit 120 and/or co-processing unit 140 via data bus 150. Input device 110 can be, for example, a microphone, a touchpad, or other similar types of sensor devices.

Figure 2:
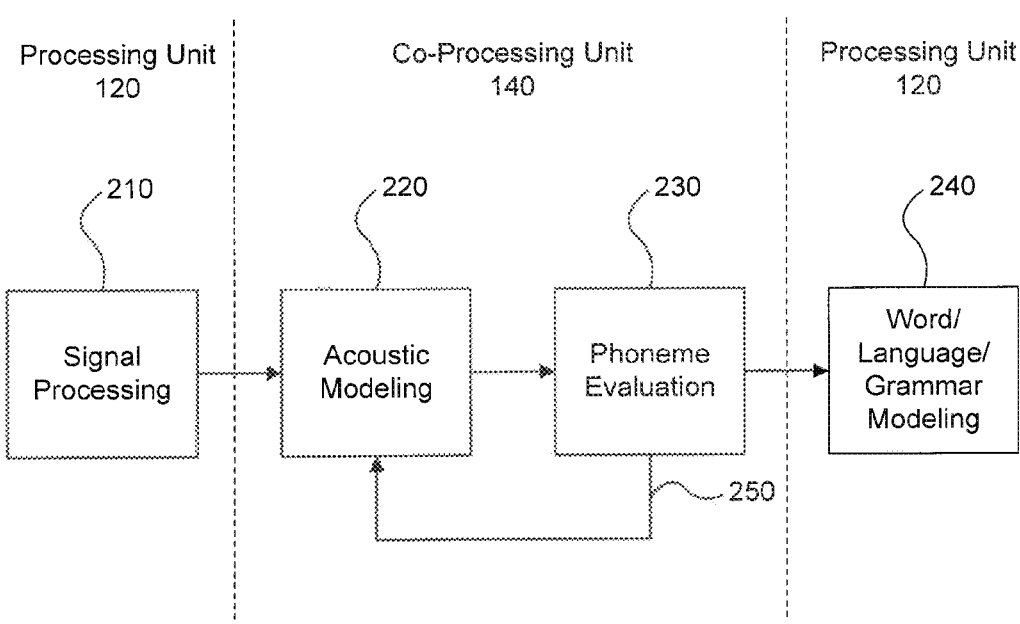
FIG. 2 is an illustration of an example speech recognition process, according to an embodiment.

Processing unit 120 and co-processing unit 140 can be used to process the resulting digital signal from input device 110. For example, processing unit 120 and co-processing unit 140 can be used to decode speech. FIG. 2 is an illustration of an example speech recognition process 200. Here, processing unit 120 performs a signal processing process 210 and a word/language/grammar modeling process 240. Co-processing unit 140 performs an acoustic modeling process 220 and a phoneme evaluation process 230. In an embodiment, co-processing unit 140 can include an HMM processing engine (described in further detail below) to process and score HMMs associated with phoneme evaluation process 230. According to some embodiments, example information on the signal processing, acoustic modeling, phoneme evaluation, and word/language/grammar modeling processes can be found in U.S. patent application Ser. No. 13/725,260, filed Dec. 21, 2012, titled "Phoneme Score Accelerator," which is incorporated by reference in its entirety.

Although system 100 is described in the context of a speech recognition environment, based on the description herein, a person skilled in the relevant art will recognize that the embodiments disclosed herein can be applied to other types of environments such as, for example and without limitation, text-to-speech applications, handwriting recognition, gesture recognition, bioinformatics, and cryptanalysis. These other types of environments are within the spirit and scope of the embodiments disclosed herein.

2. Embodiment of a Hidden Markov Model (HMM) Data Structure

FIG. 3 is an illustration of an embodiment an HMM data structure 300, which can be processed by embodiments disclosed herein. Element 310 provides data length information (DATA_LENGTH), which corresponds to the data length of the HMM structure. The data length can be, for example, in terms of bytes. For example, if the HMM structure contains 30 fields, in which each field equates to a byte of information, then DATA_LENGTH is equal to 30 bytes.

Element 320 provides the HMM information. Element 320 includes:
  HMM_ID: unique identifier for the HMM;
  NUM_STATES: total number of states in the HMM, including, for example, both NULL and non-NULL states;
  BEST_SCR: a best score for the HMM;
  <STATE>_PTR: one or more pointers corresponding to a respective <STATE> field for each HMM state;
  <OBS_PROB>: an observation probability for each HMM state;
  <PATH>_PTR: one or more pointers corresponding to a respective <PATH> field for each HMM state; and,
  <STATE_TYPE_FLAGS>: number of bits equaling the number of HMM states, where each bit indicates whether its respective HMM state is NULL or non-NULL (e.g., for three HIMM states, <STATE_TYPE_FLAGS> includes three bits—one for each HMM state).

Element 330 provides the <STATE> field. In an embodiment, the <STATE> field occurs once per HMM state. Each <STATE> field includes:
  CURR_SCR: a current score for the HMM state;
  BKPTR: a back pointer to a previous HMM; and,
  OBS_PROB_ID: a pointer used to fetch an observation probability (OBS_PROB) for the HMM state.

The BKPTR field is an HMM_ID value of a previous HMM. This field is passed along at every state of an HMM structure based on a best path selected at each state. When the current HMM reaches its last state, the BKPTR field provides a link between the current HMM and the previous HMM. The BKPTR further defines the incoming path to the current HMM.

Element 340 provides the <OBS_PROB> field. In an embodiment, the <OBS_PROB field occurs once per HMM state, in which this field indicates the observation probability for the HMM state. In an embodiment, if HMM states and observation probabilities (OBS_PROB) do not have a one-to-one mapping (e.g., senones shared among multiple HMM states), OBS_PROB_ID can be used to identify the observation probability associated with a particular HMM state. As would be understood by a person skilled in the relevant art, multiple HMM states in an HMM structure can share the same senone—i.e., the same value for <OBS_PROB> or senone score. In an embodiment, the value of the observation probability for the HMM state can either be stored in the OBS_PROB field or referred to in the OBS_PROB_ID field (e.g., as a pointer).

Element 350 provides the <PATH> field. In an embodiment, the <PATH> field occurs once per HMM state and includes:
  NUM_PRED: number of predecessor HMM states for a current HMM state; and
  <PATH_INFO>.

Element 360 provides the <PATH_INFO> field. In an embodiment, the <PATH_INFO> field occurs once per predecessor HMM state and includes:
  PRED_STATE_PTR: a pointer to a predecessor HMM state; and,
  TRANS_PROB: transition probability associated with the predecessor HMM state.

The TRANS_PROB field can be replaced by a TRANS_PROB_ID field when a one-to-one mapping does not exist between HMM paths and transition probabilities, according to an embodiment. As would be understood by a person skilled in the relevant art, multiple HMM paths in an HMM structure can share the same transition probability. In an embodiment, the value of the transition probability of the HMM path can either be stored in the TRANS_PROB field or referred to in the TRANS_PROB_ID field (e.g., as a pointer). In using the TRANS_PROB_ID field, transition probabilities can be shared among multiple HMM paths.

Element 370 provides the <STATE_TYPE_FLAGS> field. Each bit in this field corresponds to a respective "type" of an HMM state, according to an embodiment. For example, each bit in the <STATE_TYPE_FLAGS> field can either have a value of '0' or '1'. A value of '0' indicates that the HMM state is "NULL" or "non-emitting." Conversely, a value of '1' indicates that the HMM state is "non-NULL" or "emitting."

HMM data structure 300 can be applied to any HMM structure including, but not limited to, Ergodic, left-to-right, and parallel path left-to-right HMM structures. FIGS. 4A-4E are illustrations of example HMM structures that HMM data structure 300 can represent.

Figure 4A:
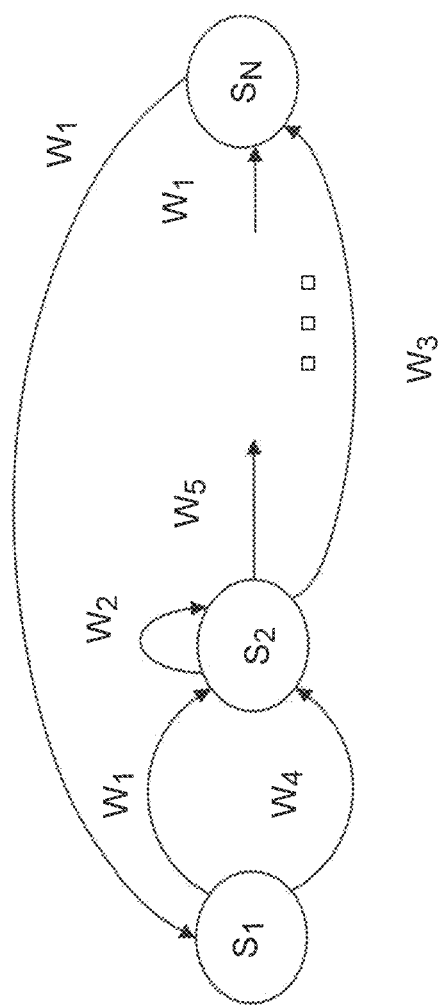
FIGS. 4A-4E are illustrations of Hidden Markov Model (HMM) data structures, according to an embodiment.
Figure 4B:
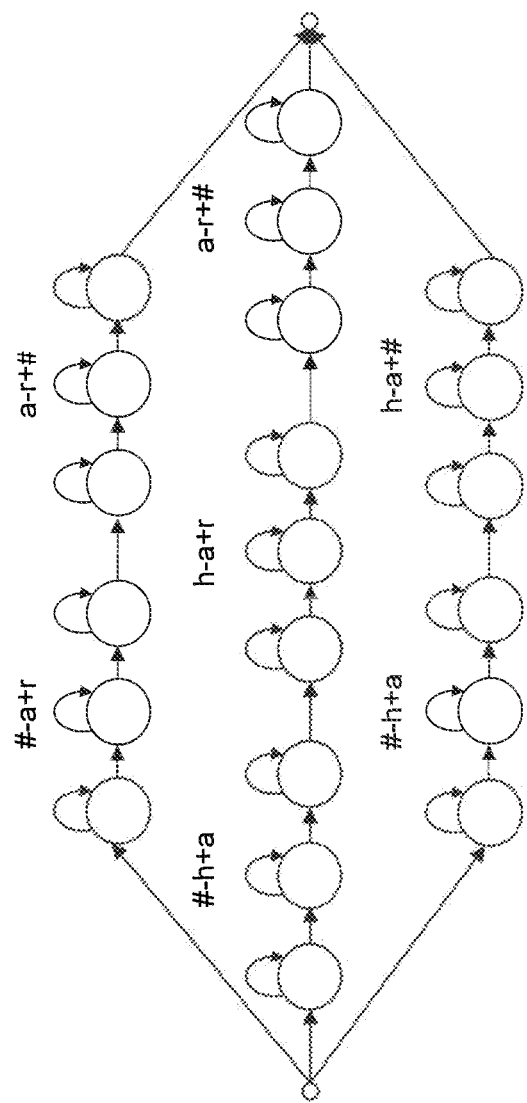

FIGS. 4A and 4B are illustrations of example finite state networks or grammars that may incorporate NULL transitions (i.e., transitions that produce no output). As would be understood by a person skilled in the relevant art, NULL transitions may be used to concatenate multiple smaller HMM structures into one larger HMM structure. Such networks are typically used for language or syntax modeling (e.g., bi-gram and tri-gram models typically used in speech recognition and handwriting recognition applications).

Figure 4C:
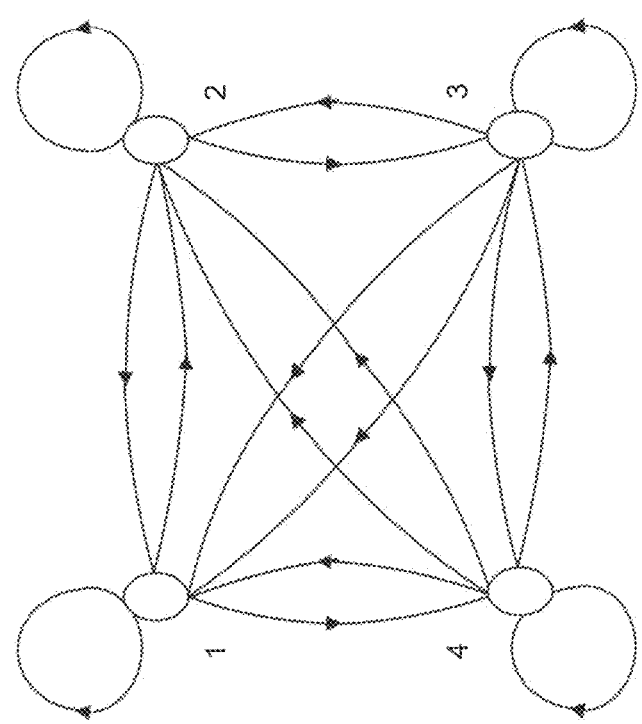
Figure 4D:
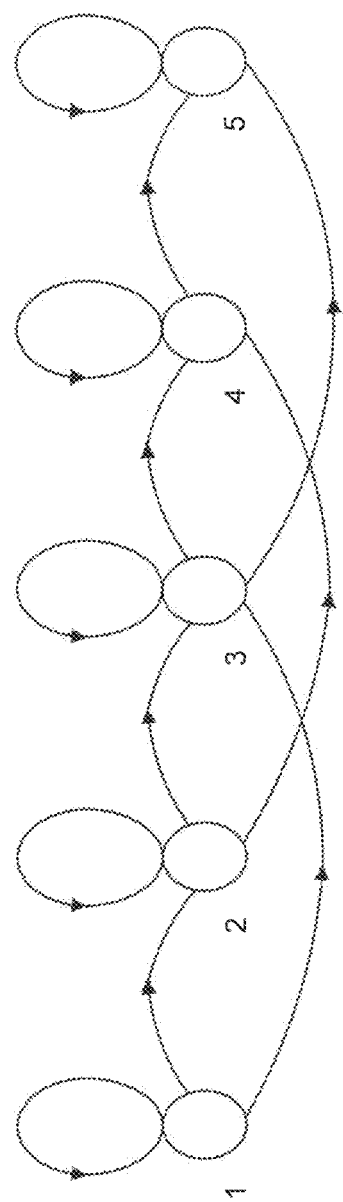
Figure 4E:
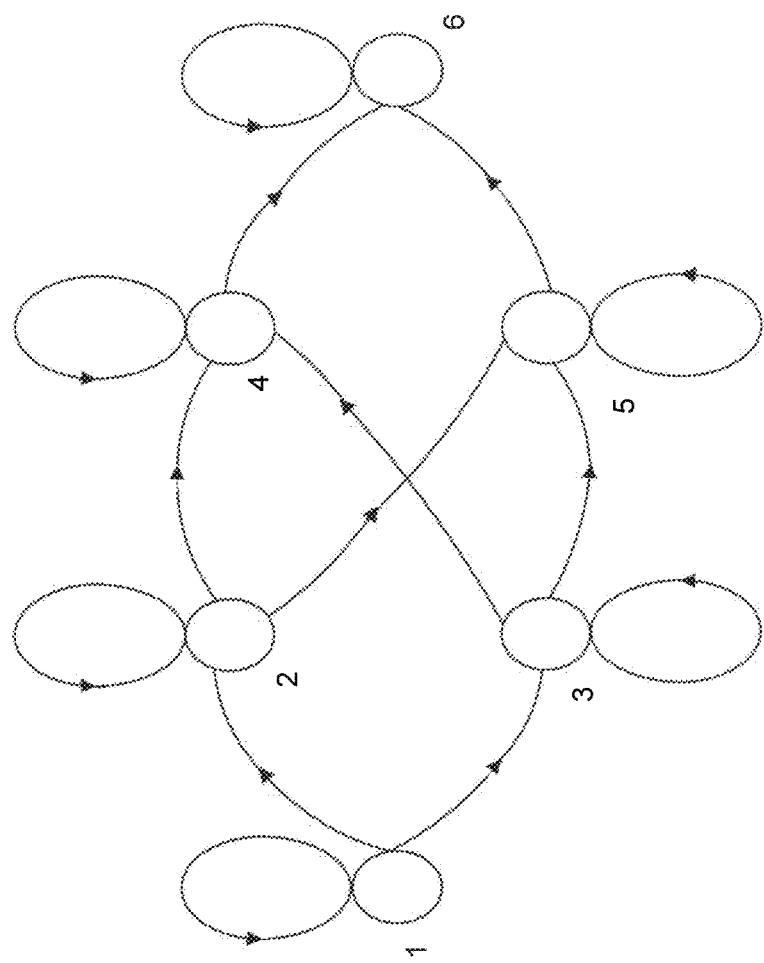

FIG. 4C is an illustration of an example four-state Ergodic HMM structure. Here, the Ergodic HMM structure is a fully connected model, in which each HMM state can be reached in one step from every other HMM state. FIG. 4D is an illustration of an example five-state left-to-right, or Bakis, HMM structure, in which transitions are not permitted to an HMM state with a lower index than a current state. FIG. 4E is an illustration of an example six-state parallel path left-to-right HMM structure. Similar to the five-state left-to-right HMM structure of FIG. 4D, the HMM structure of FIG. 4E does not permit transitions to an HMM state with a lower index than a current state.

The HMM structures of FIGS. 4C-4E can be used to model observation sequences such as, for example, speech features (e.g., human utterances), handwriting features (e.g., pen strokes), gesture features (e.g., hand strokes or actions), and biological sequences (e.g., genetics). For speech recognition applications, the Ergodic HMM structure of FIG. 4C can be used for silence modeling. The left-to-right HMM structures or left-to-right HMM structures with skips can be used for context-dependent modeling. For handwriting recognition applications, a seven-state left-to-right HMM structure with skips can be used to model individual letters or entire words. For gesture recognition applications, a five-state left-to-right HMM structure with skips can be used for recognition processing.

Figure 5:
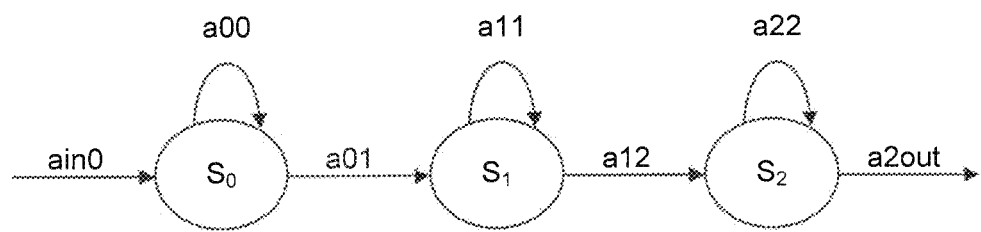
FIG. 5 is an illustration of an example three-state left-to-right Hidden Markov Model (HMM) structure, according to an embodiment.

FIG. 5 is an illustration of an example three-state left-to-right HMM structure 500. For ease of reference and example purposes, HMM structure 500 will be used to facilitate in the explanation of the fields of HMM data structure 300 in FIG. 3. In an embodiment, HMM data structure 300 can have the following values:

TABLE 1

Example Values for HMM Structure

| | |
|---|---|
| DATA_LENGTH | 40 bytes |
| HMM_ID | 1574 |
| NUM_STATES | 3 |
| BEST_SCR | 25 |
| <STATE>_PTR | st_ptr1 (pointer 1 for state $S_0$) |
| | st_ptr2 (pointer 2 for state $S_1$) |
| | st_ptr3 (pointer 3 for state $S_2$) |
| <OBS_PROB> | ob_prob1 = 732 (senone score for state $S_0$) |
| | ob_prob2 = 481 (senone score for state $S_1$) |
| | ob_prob3 = 536 (senone score for state $S_2$) |
| <PATH_PTR> | path_ptr1 (pointer 1 for HMM path for state $S_0$) |
| | path_ptr2 (pointer 2 for HMM path for state $S_1$) |
| | path_ptr3 (pointer 3 for HMM path for state $S_2$) |
| <STATE_TYPE_FLAGS> | bit1 = '1' (e.g., state $S_0$ is "non-NULL" or "emitting") |
| | bit2 = '0' (e.g., state $S_1$ is "NULL" or "non-emitting") |
| | bit3 = '1' (e.g., state $S_2$ is "non-NULL" or "emitting") |

In referring to Table 1, in an embodiment, the state pointer fields (<STATE>_PTR) can have the following values:

TABLE 2

Example Values for <STATE>_PTR Fields

| | |
|---|---|
| st_ptr1 | CURR_SCR = 26 |
| | BKPTR = 1211 |
| | OBS_PROB_ID = ob_prob1 |
| st_ptr2 | CURR_SCR_455 |
| | BKPTR = 1255 |
| | OBS_PROB_ID = ob_prob2 |
| st_ptr3 | CURR_SCR = 62 |
| | BKPTR = 1406 |
| | OBS_PROB_ID = ob_prob3 |

In Table 2, for st_ptr1, OBS_PROB_ID is a pointer to the value of the observation probability for state $S_0$ (i.e., ob_prob1). Similarly, for st_ptr2 and st_ptr3, their respective OBS_PROB_IDs are pointers to the values of the observation probabilities for states $S_1$ and $S_2$, respectively.

In an embodiment and in referring to Table 1, the path pointer fields (<PATH>_PTR) can have the following values:

TABLE 3

Example Values for <PATH>_PTR Fields

| | |
|---|---|
| path_ptr1 | NUM_PRED = 2 |
| | <PATH_INFO> |
| | ● For the first predecessor path: |
| | ○ PRED_STATE_PTR = st_ptr1 |
| | ○ TRANS_PROB = 456 |
| | ● For the second predecessor path: |
| | ○ PRED_STATE_PTR = NULL |
| | ○ TRANPROB = 106 |
| path_ptr2 | NUM_PRED = 2 |
| | <PATH_INFO> |
| | ● For the first predecessor path: |
| | ○ PRED_STATE_PTR = st_ptr1 |
| | ○ TRANS_PROB = 333 |
| | ● For the second predecessor path: |
| | ○ PRED_STATE_PTR = st_ptr2 |
| | ○ TRAN_PROB = 222 |
| path_ptr3 | NUM_PRED = 2 |
| | <PATH_INFO> |
| | ● For the first predecessor path: |
| | ○ PRED_STATE_PTR = st_ptr2 |
| | ○ TRANS_PROB = 112 |
| | ● For the second predecessor path: |
| | ○ PRED_STATE_PTR = st_ptr3 |
| | ○ TRAN_PROB = 501 |

In Table 3, for path_ptr1, the first predecessor path refers to path "a00" and the second path refers to path "ain0" in FIG. 5. Since path "ain0" is the beginning of HMM structure 500, its PRED_STATE_PTR value is NULL and its TRANS_PROB value of 456 indicates an incoming probability to the HMM structure. For path_ptr2, the first predecessor path refers to path "a01" and the second predecessor path refers to path "a11." Further, for path_ptr3, the first predecessor path refers to path "a12" and the second predecessor path refers to path "a22." The PRED_STATE_PTR information for path_ptr1, path_ptr2, and path_ptr3 point to HMM state information for states $S_0$, $S_1$, and $S_2$ of HMM structure 300 in FIG. 3, respectively (i.e., st_ptr1, st_ptr2, and st_ptr3, respectively).

FIG. 6 is an illustration of a complete HMM data structure 600 for HMM structure 500 of FIG. 5. Element 610 provides the data length of the data structure in bytes. For example, HMM data structure 600 can be represented by 40 bytes of information. In an embodiment, each byte can represent a respective field in HMM data structure 600. In another embodiment, each byte can represent one or more respective fields in HMM data structure 600. Table 4 provides an example mapping of each of the bytes in HMM data structure 600 to a respective field in the HMM data structure, according to an embodiment.

TABLE 4

Example Mapping of Bytes in HMM Data Structure to Respective HMM Data Structure Fields

| Byte Index | Field |
|---|---|
| 1 | DATA_LENGTH (value = 40) |
| 2 | HMM_ID (value = 1574) |
| 3 | NUM_STATES (value = 3) |
| 4 | BEST_SCR (value = 25) |
| 5 | BYTE INDEX to st_ptr1 (value = 8) |
| 6 | BYTE INDEX to st_ptr2 (value = 11) |
| 7 | BYTE INDEX to st_ptr3 (value = 14) |
| 8 | CURR_SCR for st_ptr1 (value = 26) |
| 9 | BKPTR for st_ptr1 (value = 1211) |
| 10 | OBS_PROB_ID for st_ptr1 (value = 17) |
| 11 | CURR_SCR for st_ptr2 (value = 455) |
| 12 | BKPTR for st_ptr2 (value = 1255) |

TABLE 4-continued

Example Mapping of Bytes in HMM Data Structure to Respective HMM Data Structure Fields

| Byte Index | Field |
|---|---|
| 13 | OBS_PROB_ID for st_ptr2 (value = 18) |
| 14 | CURR_SCR for st_ptr3 (value = 62) |
| 15 | BKPTR for st_ptr3 (value = 1406) |
| 16 | OBS_PROB_ID for st_ptr3 (value = 19) |
| 17 | ob_prob1 (value = 732) |
| 18 | ob_prob2 (value = 481) |
| 19 | ob_prob3 (value = 536) |
| 20 | BYTE INDEX to path_ptr1 (value = 23) |
| 21 | BYTE INDEX to path_ptr2 (value = 28) |
| 22 | BYTE INDEX to path_ptr3 (value = 33) |
| 23 | NUM_PRED for path_ptr1 (value = 2) |
| 24 | First PRED_STATE_PTR for path_ptr1 (value = st_ptr1 = 8) |
| 25 | First TRANS_PROB for path_ptr1 (value = 456) |
| 26 | Second PRED_STATE_PTR for path_ptr1 (value = NULL) |
| 27 | Second TRANS_PROB for path_ptr1 (value = 106) |
| 28 | NUM_PRED for path_ptr2 (value = 2) |
| 29 | First PRED_STATE_PTR for path_ptr2 (value = st_ptr1 = 8) |
| 30 | First TRANS_PROB for path_ptr2 (value = 333) |
| 31 | Second PRED_STATE_PTR for path_ptr2 (value = st_ptr2 = 11) |
| 32 | Second TRANS_PROB for path_ptr2 (value = 222) |
| 33 | NUM_PRED for path_ptr3 (value = 2) |
| 34 | First PRED STATE_PTR for path_ptr3 (value = st_ptr2 = 11) |
| 35 | First TRANS_PROB for path_ptr3 (value = 112) |
| 36 | Second PRED_STATE_PTR for path_ptr3 (value = st_ptr3 = 14) |
| 37 | Second TRANS_PROB for path_ptr3 (value = 501) |
| 38 | STATE_TYPE_FLAG for bit1 (value = 1) |
| 39 | STATE_TYPE_FLAG for bit2 (value = 0) |
| 40 | STATE_TYPE_FLAG for bit3 (value = 1) |

In referring to Table 4, pointers have a value that indicates the location of the information within the HMM data structure. For example, HMM data structure 600 of FIG. 6 includes six pointers: st_ptr1; st_ptr2; st_ptr3; path_ptr1; path_ptr2; and, path_ptr3. In referring to Table 4, the field for the fifth byte of HMM data structure 600 is "BYTE INDEX to st_ptr1 (value=8)." This field indicates that the values required to process the HMM state information for state $S_0$ (see FIG. 5) begins at the eighth byte of HMM data structure 600 ("value=8"), which includes CURR_SCR information for state $S_0$. Based on this index information, BKPTR and OBS_PROB_ID information for state $S_0$ can also be located, as these fields follow CURR_SCR in the HMM data structure. The state and path information for st_ptr2, st_ptr3, path_ptr1, path_ptr2, and path_ptr3 can be located in HMM data structure 600 in a similar manner.

For pointers that refer to other pointers in HMM data structure 600, the HMM information can be located in a similar manner as described above. For example, in referring to byte index 24—PRED_STATE_PTR for path_ptr1—in Table 4, this field has a value of 8. Here, the value of 8 represents the byte index in HMM data structure 600 for HMM state information associated with st_ptr1 (state $S_0$). The state information for path_ptr2 and path_ptr3 can be located in HMM data structure 600 in a similar manner. Also, the observation probability information for OBS_PROB_ID for st_ptr1, st_ptr2, and st_ptr3 can be located in HMM data structure 600 in a similar manner—e.g., OBS_PROB_ID for st_ptr1 has a value of 17, which refers to the byte index of ob_prob1.

Although the above description of HMM data structure 600 is in the context of HMM structure 500 of FIG. 5, based on the description herein, a person skilled in the relevant art will recognize that other HMM structures (such as those illustrated in FIGS. 4A-4E) can be represented by HMM data structure 600. These other HMM structures are within the spirit and scope of the embodiments disclosed herein.

3. Embodiments of a Hidden Markov Model (HMM) Processing Engine

Figure 7:
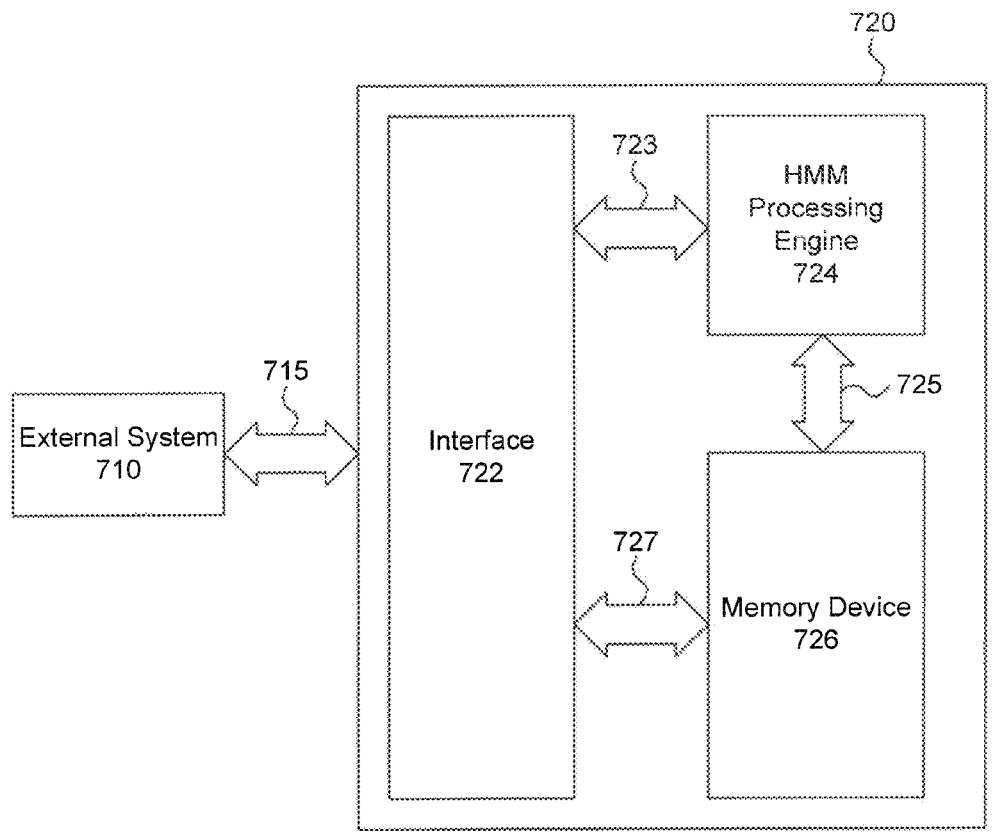
FIG. 7 is an illustration of an embodiment of a Hidden Markov Model (HMM) system in which example embodiments, or portions thereof, can be implemented.

FIG. 7 is an illustration of an embodiment of an HMM system 700, in which embodiments, or portions thereof, can be implemented. HMM system 700 includes an external system 710 and an HMM module 720. In an embodiment, external system 710 includes processing unit 120 and memory device 130 of FIG. 1. HMM system 700 can be implemented in system 100 of FIG. 1. For example, HMM module 720 can be implemented in co-processing unit 140 and perform phoneme evaluation process 230 of FIG. 2. External system 710 can be implemented in processing unit 120 and perform signal processing process 210 and word/language/grammar modeling process 240 of FIG. 2.

In referring to FIG. 7, HMM module 720 includes an interface 722, an HMM processing engine 724, and a memory device 726. HMM system 700 can be used to update state scores from HMM structures including, but not limited to, the HMM structures illustrated in FIGS. 4A-4E. The HMM state scores can be updated on every observation, in which the scores can depend on observation probabilities, probabilities of previous scores from predecessor states, and transition probabilities from predecessor states to the current state, as would be understood by a person skilled in the relevant art.

In referring to FIG. 7, HMM module 720 communicates with external system 710 via a data bus 715. External system 710 and HMM module 720 can be integrated in the same physical component (e.g., chip), according to an embodiment. Alternatively, external system 710 and HMM module 720 can be on separate physical components (e.g., separate chips). In an embodiment, interface 722 is configured to receive HMM information from external system 710 via data bus 715. In an embodiment, data bus 715 can be integrated into data bus 150 of FIG. 1. The HMM information can be stored in a memory device (e.g., memory device 130 of FIG. 1) associated with external system 710, in which HMM module 720 receives the HMM information from external system 710 via a single read access to the memory device, according to an embodiment. HMM module 720 accesses the HMM information from the memory device associated with external system 710 based on an HMM identifier (e.g., HMM_ID of FIG. 3).

Upon receipt of the HMM information, interface 722 transfers the HMM information to HMM processing engine 724 and memory device 726 via a data bus 723 and a data bus 727, respectively. In an embodiment, interface 722 transfers the HMM information to HMM processing engine 724 and memory device 726 in a format conforming to HMM data structure 300 of FIG. 3. For example, after the HMM information is fetched from a memory device associated with external system 710 (e.g., memory device 130 of FIG. 1), interface 722 formats the HMM information in conformity with HMM data structure 300 such that the HMM data structure can be treated as a contiguous block of data. An example of the contiguous block of data is described above with respect to FIG. 6 and Table 4.

In an embodiment, HMM processing engine 724 updates HMM state scores and writes the updated state scores to memory device 726, via a data bus 725, based on the format defined by HMM data structure 300 of FIG. 3. Memory device 726 can be, for example, a static random access memory (SRAM) device, a DRAM device, flip-flops, or other similar types of storage devices. After the HMM state scores are updated per observation, memory device 726 transfers the updated HMM state scores to interface 722 via data bus 727, according to an embodiment. In turn, interface 722 transfers the updated HMM state scores to external system 710 via data bus 715. External system 710 can use the updated HMM state score information for further processing.

Figure 8:
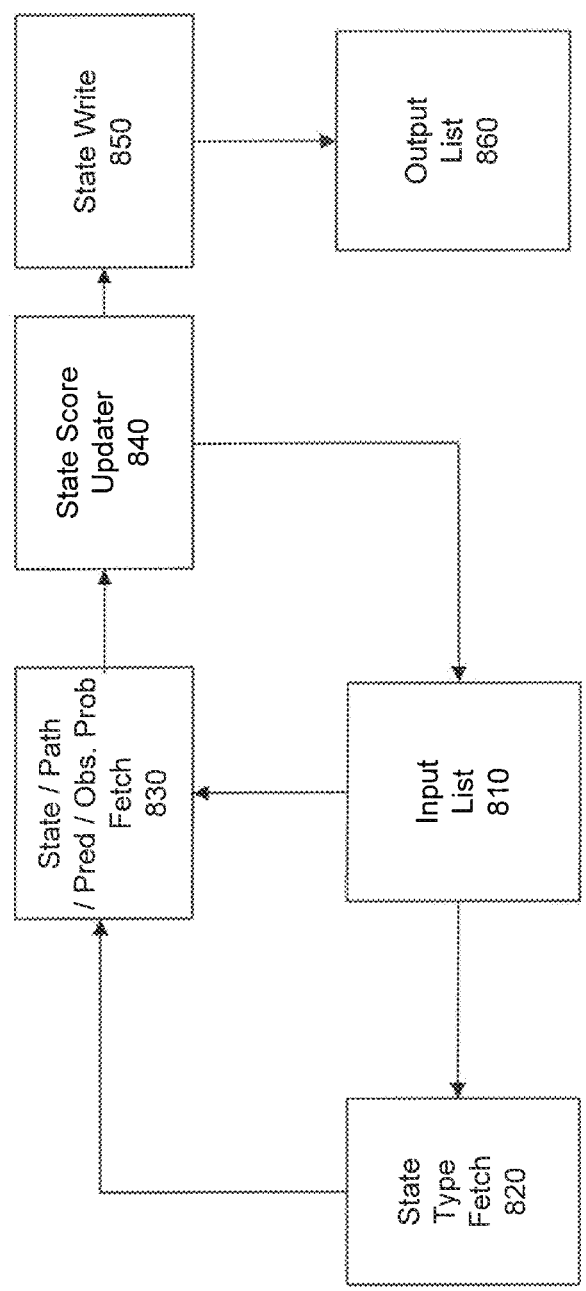
FIG. 8 is an illustration of an example embodiment of a Hidden Markov Model (HMM) processing engine.

FIG. 8 is an illustration of an embodiment of HMM processing engine 724. HMM processing engine 724 includes an input list module 810, a state type fetch module 820, a state/path/predecessor/observation probability ("SPPOP") fetch module 830, a state score updater module 840, a state write module 850, and an output list module 860. In an embodiment, input list module 810 and output list module 860 can be external to HMM processing engine 724. For example, input list module 810 and output list module 860 can be integrated into memory device 726 of FIG. 7. Input list module 810 and output list module 860 store HMM information in conformity with the format of HMM data structure 300 of FIG. 3, according to an embodiment.

Further, in an embodiment, HMM processing engine 724 has a priori knowledge of the HMM data structure that it receives from interface 722 and accesses state and path information based on their respective indices in the HMM data structure. For example, in referring to Table 4 above, HMM processing engine 724 has knowledge of the various fields of HMM data structure 600 in FIG. 6 and the byte index location of each of the fields. When updating HMM state scores, HMM processing engine 724 accesses state and path information from HMM data structure 600 based on their respective byte indices in the data structure—e.g., in referring to Table 4: st_ptr1 information has a byte index of 8; st_ptr2 has a byte index of 11; st_ptr3 has a byte index of 14; path_ptr1 has a byte index of 23; path_ptr2 has a byte index of 28; and, path_ptr3 has a byte index of 33.

In referring to FIG. 8, input list module 810 is configured to store the HMM data structure (e.g., HMM data structure 300 of FIG. 3) that is formatted and received by interface 722 of FIG. 7. In referring to HMM data structure 300 of FIG. 3, state type fetch module 820 of FIG. 8 loops through each state pointer (<STATE>_PTR) in the HMM data structure stored in input list module 810 and passes state pointers one-by-one to SPPOP fetch module 830, according to an embodiment. For an HMM structure with three states (e.g., HMM structure 500 of FIG. 5), three state pointers are passed from state type fetch module 820 to SPPOP fetch module 830.

In an embodiment, state pointers associated with a NULL state (<STATE_TYPE_FLAG>=0) are processed first, followed by state pointers associated with a non-NULL state (<STATE_TYPE_FLAG>=1). For state pointers without NULL states, then only state pointers with non-NULL states are processed as described below.

For state pointers associated with a NULL state, state type fetch module 820 passes these state pointers to SPPOP fetch module 830. In addition to the state pointers associated with a NULL state, SPPOP fetch module 830 receives probability and path information from the HMM data structure (e.g., <OBS_PROB> and <PATH>_PTR) stored in input list module 810. State score updater module 840 updates the state scores of the HMM data structure based on the state, probability, and path information received from SPPOP fetch module 830. In an embodiment, the updated state scores are transferred from state score updater module 840 to input list module 810. The updated state scores are also transferred from state score updater module 840 to output list module 860 via state write module 850, according to an embodiment. In addition, updated back pointer data is transferred to input list module 810 and output list module 860, according to an embodiment. Any remaining state pointers associated with a NULL state are processed in a similar manner.

Figure 9:
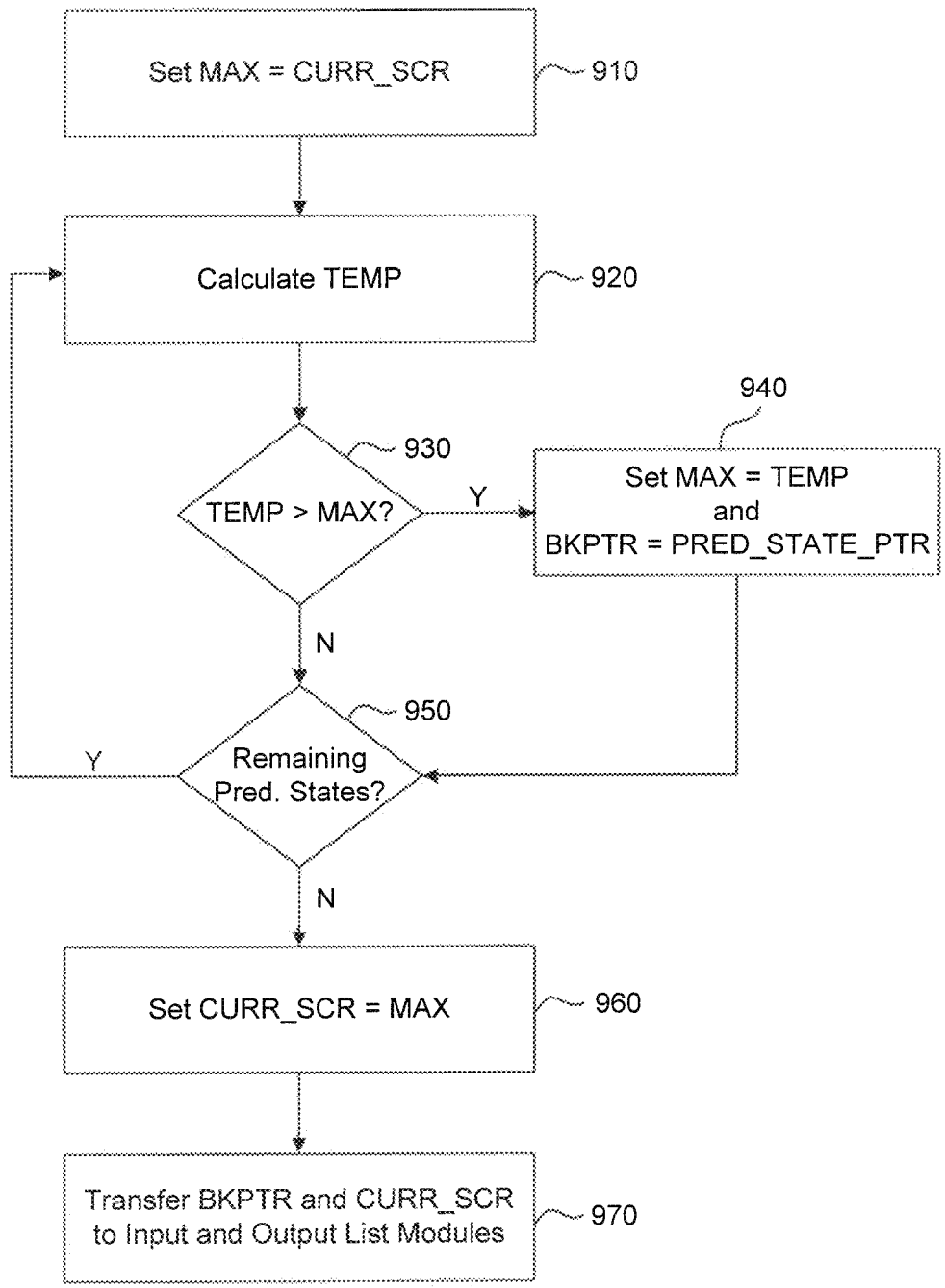
FIG. 9 is an illustration of an example embodiment of a method for processing a Hidden Markov Model (HMM) data structure with a NULL state.

FIG. 9 is an illustration of a method 900 for processing an HMM state associated with a NULL state, according to an embodiment. In step 910, a maximum value (MAX) is set to the HMM state's current score (CURR_SCR). This is an initialization value for MAX. For example, in referring to HMM data structure 600 of FIG. 6 and Table 4 above, HMM processing engine 724 can retrieve the HMM state's current score by accessing byte index 11 (for state $S_1$), which is the only NULL state in HMM data structure 600 (<STAT_TYPE_FLAG>=0).

In step 920, for each predecessor state associated with the HMM state, a temporary value (TEMP) is set to equal the summation of the HMM state's current score (CURR_SCR), a transition probability associated with the predecessor state (TRAN_PROB), and a score of the predecessor state (PRED_CURR_SCR):

TEMP=CURR_SCR+TRANS_PROB+PRED_CURR_SCR.

In referring to HMM data structure 600 of FIG. 6 and Table 4 above, SPPOP fetch module 830 of FIG. 8 can retrieve the HMM state's current score by accessing byte index 11 (for state $S_1$) of HMM data structure 600. SPPOP fetch module 830 can retrieve the first transition probability associated with the first predecessor state by accessing byte index 30 (for state $S_1$). Further, SPPOP fetch module 830 can retrieve the score of the first predecessor state by accessing byte index 29 (for state $S_1$).

In step 930, if the temporary value is greater than the maximum value (TEMP>MAX), then in step 940, the maximum value is set to the temporary value: MAX=TEMP. In addition, the back pointer (BKPTR) for the HMM is set to the predecessor state: BKPTR=PRED_STATE_PTR. Otherwise, method 900 continues to step 950.

In step 950, for any remaining predecessor states associated with a NULL state, steps 920-940 are repeated. For example, in referring to HMM data structure 600 of FIG. 6 and Table 4 above, steps 920-940 are repeated for the second transition probability associated with the second predecessor state: byte index 32 (for state $S_1$). Further, the score of the second predecessor state can be accessed from byte index 31 (for state $S_1$). In a similar manner as described in steps 920-940, TEMP is calculated for the second predecessor state and compared to MAX (e.g., which may be an updated value based on the TEMP value in the second predecessor state). State score updater module 840 of FIG. 8 performs steps 920-940, according to an embodiment.

In step 960, after looping through the predecessor states to find the maximum value (MAX), the HMM state's current score (CURR_SCR) is set equal to the maximum value (MAX): CURR_SCR=MAX. State score updater module 840 of FIG. 8 performs steps 930-960, according to an embodiment.

In step 970, after the back pointer and state score information have been updated for each predecessor state, state score updater module 840 transfers the back pointer and state score information to input list module 810 and to output list module 860 (via state write module 850). In an embodiment, state score updater module writes the updated back pointer and state score information to input list module 810 and output list module 860 (via state write module 850) in a format consistent with HMM data structure 300 of FIG. 3. Based on the updated information in input list module 810, state pointers associated with a non-NULL state are processed.

For state pointers associated with a non-NULL state, state type fetch module 820 passes these state pointers to SPPOP fetch module 830. In addition to the state pointers associated with a non-NULL state, SPPOP fetch module 830 receives probability and path information from the HMM data structure (e.g., <OBS_PROB> and <PATH>_PTR) stored in input list module 810. State score updater module 840 updates the state scores of the HMM data structure based on the state, probability, and path information received from SPPOP fetch module 830.

In an embodiment, the updated state scores are transferred from state score updater module 840 to state write module 850, which then transfers the updated state scores to output list module 860. In addition to state scores, back pointers (BKPTR) for each state can also be updated based on a predecessor state with higher probability. Any remaining state pointers associated with a non-NULL state are processed in a similar manner.

Figure 10:
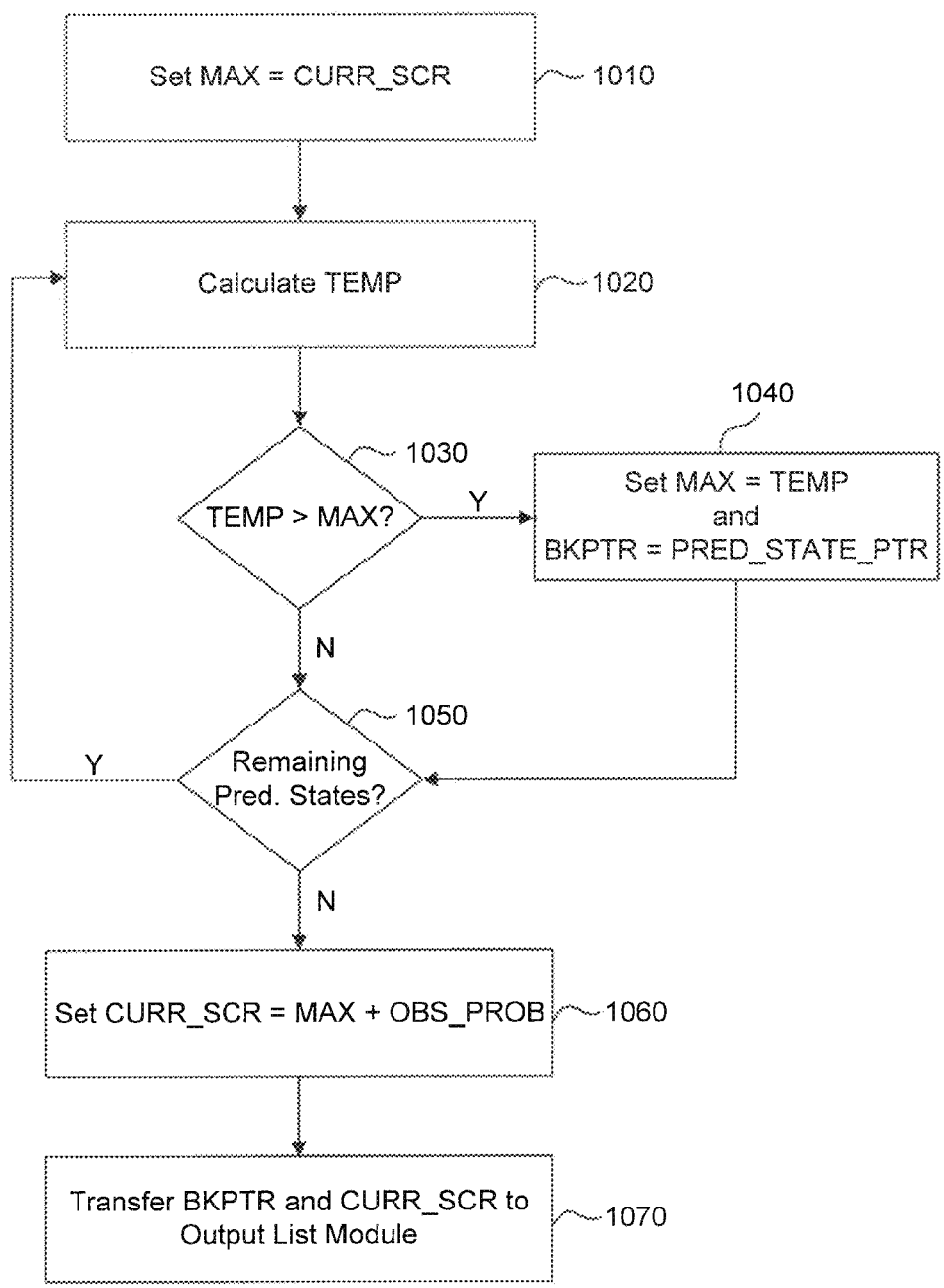
FIG. 10 is an illustration of an example embodiment of a method for processing a Hidden Markov Model (HMM) data structure with a non-NULL state.

FIG. 10 is an illustration of a method 1000 for processing an HMM state associated with a non-NULL state, according to an embodiment. In step 1010, a maximum value (MAX) is set to the HMM state's current score (CURR_SCR). For example, in referring to HMM data structure 600 of FIG. 6 and Table 4 above, HMM processing engine 724 can retrieve the HMM state's current score by accessing byte index 8 (for state $S_0$) and byte index 14 (for state $S_2$), which are the non-NULL states in HMM data structure 600 (<STATE_TYPE_FLAG>=1).

In step 1020, for each predecessor state associated with the HMM state, a temporary value (TEMP) is set to equal the summation of the HMM state's current score (CURR_SCR), a transition probability associated with the predecessor state (TRAN_PROB), and a score of the predecessor state (PRED_CURR_SCR):

TEMP=CURR_SCR+TRANS_PROB+PRED_CURR_SCR.

In referring to HMM data structure 600 of FIG. 6 and Table 4 above, SPPOP fetch module 830 of FIG. 8 can retrieve the HMM state's current score by accessing byte index 8 (for state $S_0$) and byte index 14 (for state $S_2$) of HMM data structure 600. SPPOP fetch module 830 can retrieve the transition probability associated with the predecessor state by accessing byte indices 25 and 27 for state $S_0$ and byte indices 35 and 37 for state $S_2$. Further, SPPOP fetch module 830 can retrieve the score of the predecessor state by accessing byte index 24 (for state $S_0$) and byte index 34 (for state $S_2$).

In step 1030, if the temporary value is greater than the maximum value (TEMP>MAX), then in step 1040, the maximum value is set to the temporary value: MAX=TEMP. In addition, the back pointer (BKPTR) for the HMM is set to the predecessor state: BKPTR=PRED_STATE_PTR. Otherwise, method 1000 continues to step 1050.

In step 1050, for any remaining predecessor states associated with a non-NULL state, steps 1020-1040 are repeated. For example, in referring to HMM data structure 600 of FIG. 6 and Table 4 above, steps 1020-1040 are repeated for Second PRED_DATE_PTR for path_ptr2 (byte index 31), Second TRANS_PROB for path_ptr2 (byte index 32), First PRED_DATE_PTR for path_ptr3 (byte index 34), First TRANS_PROB for path_ptr3 (byte index 35), Second PRED_DATE_PTR for path_ptr3 (byte index 36), and Second TRANS_PROB for path_ptr3 (byte index 37). In a similar manner as described in steps 1020-1040, TEMP is calculated and compared to MAX (e.g., which may be an updated value based on the updated TEMP values).

In step 1060, after looping through the predecessor states to find the maximum value (MAX), the HMM state's current score (CURR_SCR) is set to equal to the summation of the maximum value and an observation probability associated with the HMM state: CURR_SCR=MAX+OBS_PROB. State score updater module 840 of FIG. 8 performs steps 1030-1060, according to an embodiment.

In step 1070, after the back pointer and state score information have been updated, state score updater module 840 transfers the back pointer and state score information to output list module 860 (via state write module 850). In an embodiment, state score updater module 840 writes the updated back pointer and state score information to output list module 860 (via state write module 850) in a format consistent with HMM data structure 300 of FIG. 3.

In addition to updating HMM back pointer and state score information, HMM processing engine 724 of FIG. 8 also tracks the best score for the HMM (BEST_SCR) and transfers this score to the HMM data structure stored in output list module 860. In an embodiment, after the HMM data structure has been updated (e.g., per observation), the updated HMM information is transferred from output list module 860 to interface 722 via data bus 727 of FIG. 7. In turn, interface 722 transfers the updated HMM information to external system 710 via data bus 715. HMM module 720 can request new HMMs from external system 710 based on an HMM identifier (e.g., HMM_ID of FIG. 3), in which the new HMM information is accessed from the memory device associated with external system 710 via a single read access, according to an embodiment.

4. Embodiment of a Method for Hidden Markov Model (HMM) Processing

Figure 11:
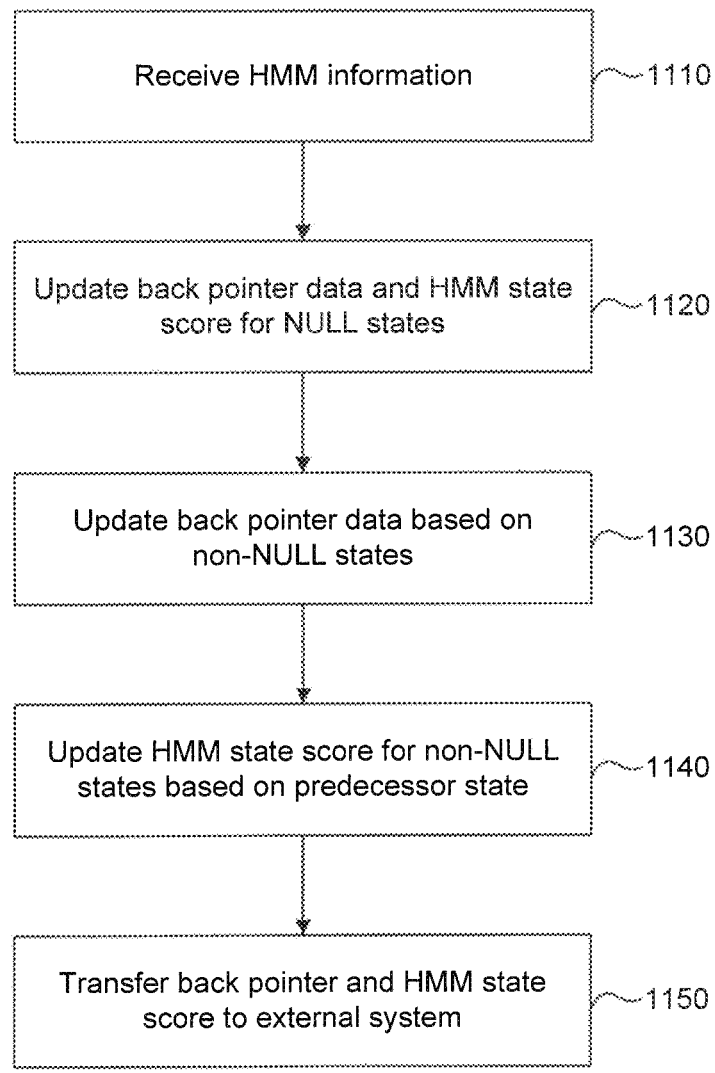
FIG. 11 is an illustration of an example embodiment of a method for processing an HMM data structure.

FIG. 11 is an illustration of an embodiment of a method 1100 for processing an HMM data structure. In an embodiment, method 1100 can be performed by, for example, HMM module 720 of FIG. 7.

In step 1110, HMM information is received by, for example, HMM module 720 from external system 710 of FIG. 7. In an embodiment, the HMM information is formatted into an HMM data structure that contains information for an HMM processing engine (e.g., HMM processing engine 724 of FIG. 7) to update scores of HMM structures of varying type and length. In an embodiment, the HMM data structure conforms to HMM data structure 300 of FIG. 3 and includes an HMM identification, a number of states associated with an HMM structure, a best score associated with the HMM structure, a state pointer for each of one or more NULL and non-NULL states, an observation probability for each of the one or more non-NULL states, a path pointer for each of the one or more NULL and non-NULL states, and a state-type flag for each of the one or more NULL and non-NULL states, or a combination thereof.

In an embodiment, the external system can include a memory device (e.g., memory device 130 of FIG. 1). In step 1110, the HMM information can be transferred from the memory device to HMM module 720 via a single read access, according to an embodiment. Further, in an embodiment, HMM module 720 can receive different types of HMM structures and HMM structures with variable length.

In step 1120, back pointer and state score data for one or more NULL states in the HMM information are updated. For each predecessor state associated with the one or more NULL states, the back pointer and state score data are updated based on a comparison of a summation of a state score associated with the one or more NULL states, a transition probability associated with the one or more NULL states, and a score of a predecessor state to a maximum value. An example of this comparison is discussed above with respect to step 930 of FIG. 9, where if TEMP>MAX, then BKPTR=PRED_STATE_PTR. In an embodiment, similar to steps 940 and 950 of FIG. 9, the comparison is made for all predecessor states associated with the one or more NULL states. Similar to step 960 of FIG. 9, after looping the predecessor states to find the maximum value (MAX), the HMM state's current score (CURR_SCR) is set equal to the maximum value (MAX). Further, similar to step 970 of FIG. 9, after the back pointer information has been updated for each predecessor state, the back pointer and state score information are transferred to an input list (e.g., input list module 810 of FIG. 8) and an output list (e.g., output list module of FIG. 8).

In step 1130, the back pointer data is updated based on the HMM information associated with the one or more non-NULL states. For each predecessor state associated with the one or more non-NULL states, the HMM state score is updated based on a comparison of a summation of a state score associated with the one or more NULL states, a transition probability associated with the one or more NULL states, and a score of a predecessor state to a maximum value. An example of this comparison is discussed above with respect to step 1030 of FIG. 10, where if TEMP>MAX, then BKPTR=PRED_STATE_PTR. In an embodiment, similar to steps 1040 and 1050, the comparison is made for all predecessor states associated with the one or more non-NULL states.

In step 1140, an HMM state score for one or more non-NULL states in the HMM information is updated based on at least one predecessor state. Similar to step 1060 of FIG. 10, an HMM state's current scores is set equal to the summation of the maximum value associated with one or more predecessor states (from step 1130 of FIG. 11) and an observation probability associated with the one or more non-NULL states.

In step 1150, the updated back pointer data and HMM state score is transferred to the external system. This transfer of updated back pointer data and HMM state score is similar to step 1070 of FIG. 10, where state score updater module 840 of FIG. 8 transfers the back pointer and state score information to output list module 860 (via state write module 850). In an embodiment, state score updater module 840 writes the updated back pointer and state score information to output list module 860 (via state write module 850) in a format consistent with HMM data structure 300 of FIG. 3.

A benefit, among others, of the embodiments disclosed herein is the flexibility of the HMM processing engine (e.g., HMM processing engine 724 of FIG. 7) to process different types of HMM structures—e.g., Ergodic, left-to-right, and parallel path left-to-right HMM structures—including NULL and non-NULL states. The HMM processing engine can process HMM structures of variable length (i.e., varying number of HMM states) and also process a part or the whole HMM structure. This, as a result, provides flexibility for the HMM processing engine to be implemented in various recognition applications such as, for example, speech recognition, text-to-speech application, handwriting recognition, gesture recognition, bioinformatics, and cryptanalysis.

5. Example Computer System

Figure 12:
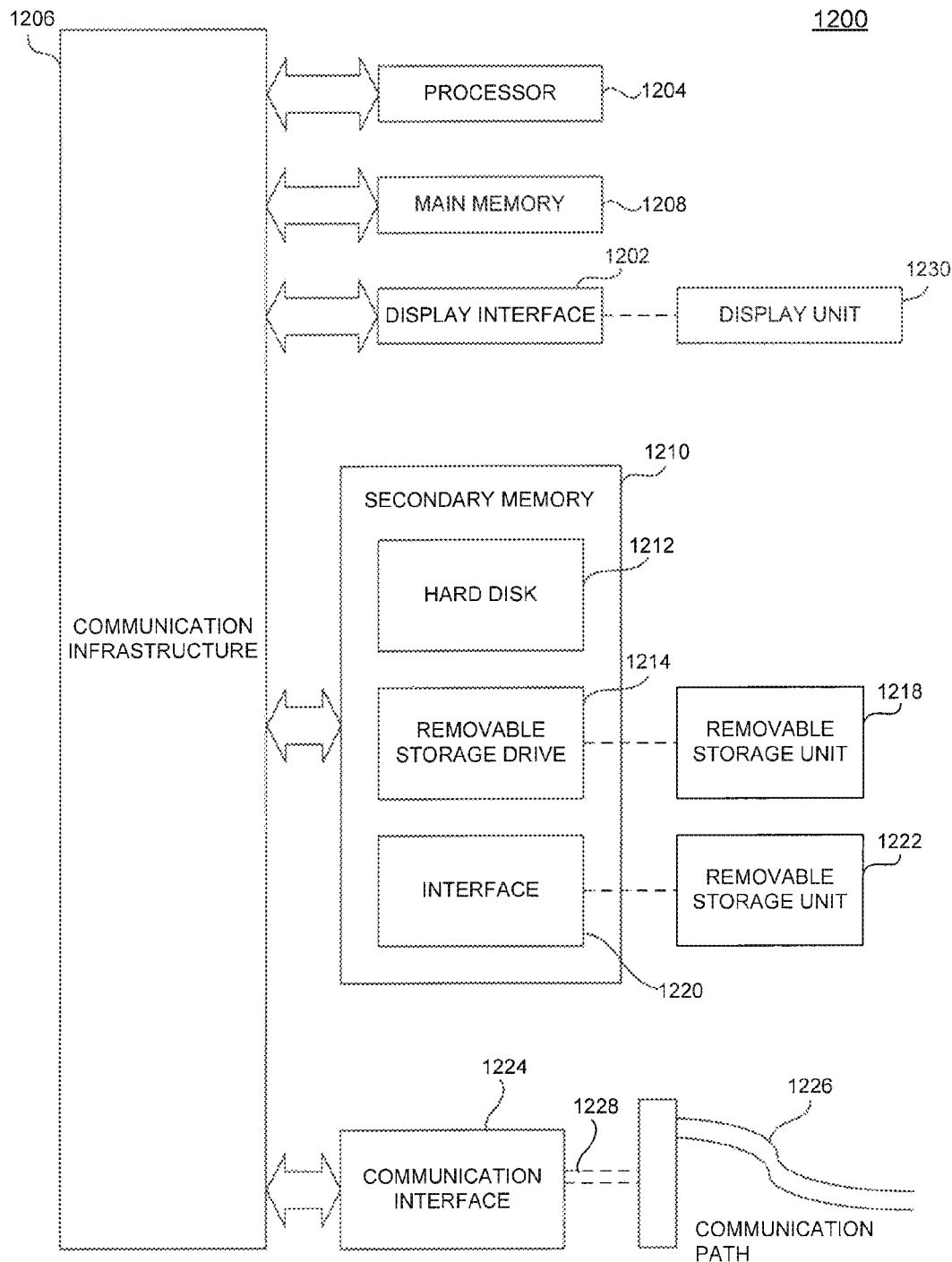
FIG. 12 is an illustration of an example computer system in which embodiments, or portions thereof, can be implemented as computer readable code.

Various aspects of embodiments of the present invention may be implemented in software, firmware, hardware, or a combination thereof. FIG. 12 is an illustration of an example computer system 1200 in which embodiments of the present invention, or portions thereof, can be implemented as computer-readable code. In an embodiment, the methods illustrated by flowchart 900 of FIG. 9, flowchart 1000 of FIG. 10, and flowchart 1100 of FIG. 11 can be implemented in system 1200. Various embodiments of the present invention are described in terms of this example computer system 1200. After reading this description, it will become apparent to a person skilled in the relevant art how to implement embodiments of the present invention using other computer systems and/or computer architectures.

It should be noted that the simulation, synthesis and/or manufacture of various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core that is embodied in program code and can be transformed to hardware as part of the production of integrated circuits.

Computer system 1200 includes one or more processors, such as processor 1204. Processor 1204 may be a special purpose or a general-purpose processor such as, for example, processing unit 120 and co-processing unit 140 of FIG. 1. Processor 1204 is connected to a communication infrastructure 1206 (e.g., a bus or network).

Computer system 1200 also includes a main memory 1208, preferably random access memory (RAM), and may also include a secondary memory 1210. Secondary memory 1210 can include, for example, a hard disk drive 1212, a removable storage drive 1214, and/or a memory stick. Removable storage drive 1214 can include a floppy disk drive, a magnetic tape drive, an optical disk drive, a flash memory, or the like. The removable storage drive 1214 reads from and/or writes to a removable storage unit 1218 in a well-known manner. Removable storage unit 1218 can comprise a floppy disk, magnetic tape, optical disk, etc. which is read by and written to by removable storage drive 1214. As will be appreciated by a person skilled in the relevant art, removable storage unit 1218 includes a computer-usable storage medium having stored therein computer software and/or data.

Computer system 1200 (optionally) includes a display interface 1202 (which can include input and output devices such as keyboards, mice, etc.) that forwards graphics, text, and other data from communication infrastructure 1206 (or from a frame buffer not shown) for display on display unit 1230.

In alternative implementations, secondary memory 1210 can include other similar devices for allowing computer programs or other instructions to be loaded into computer system 1200. Such devices can include, for example, a removable storage unit 1222 and an interface 1220. Examples of such devices can include a program cartridge and cartridge interface (such as those found in video game devices), a removable memory chip (e.g., EPROM or PROM) and associated socket, and other removable storage units 1222 and interfaces 1220 which allow software and data to be transferred from the removable storage unit 1222 to computer system 1200.

Computer system 1200 can also include a communications interface 1224. Communications interface 1224 allows software and data to be transferred between computer system 1200 and external devices. Communications interface 1224 can include a modem, a network interface (such as an Ethernet card), a communications port, a PCMCIA slot and card, or the like. Software and data transferred via communications interface 1224 are in the form of signals which may be electronic, electromagnetic, optical, or other signals capable of being received by communications interface 1224. These signals are provided to communications interface 1224 via a communications path 1226. Communications path 1226 carries signals and can be implemented using wire or cable, fiber optics, a phone line, a cellular phone link, a RF link or other communications channels.

In this document, the terms "computer program medium" and "computer-usable medium" are used to generally refer to tangible media such as removable storage unit 1218, removable storage unit 1222, and a hard disk installed in hard disk drive 1212. Computer program medium and computer-usable medium can also refer to tangible memories, such as main memory 1208 and secondary memory 1210, which can be memory semiconductors (e.g., DRAMs, etc.). These computer program products provide software to computer system 1200.

Computer programs (also called computer control logic) are stored in main memory 1208 and/or secondary memory 1210. Computer programs may also be received via communications interface 1224. Such computer programs, when executed, enable computer system 1200 to implement embodiments of the present invention as discussed herein. In particular, the computer programs, when executed, enable processor 1204 to implement processes of embodiments of the present invention, such as the steps in the methods illustrated by flowchart 900 of FIG. 9, flowchart 1000 of FIG. 10, and flowchart 1100 of FIG. 11 can be implemented in system 1200, discussed above. Accordingly, such computer programs represent controllers of the computer system 1200. Where embodiments of the present invention are implemented using software, the software can be stored in a computer program product and loaded into computer system 1200 using removable storage drive 1214, interface 1220, hard drive 1212, or communications interface 1224.

Embodiments are also directed to computer program products including software stored on any computer-usable medium. Such software, when executed in one or more data processing device, causes a data processing device(s) to operate as described herein. Embodiments of the present invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

6. Conclusion

It is to be appreciated that the Detailed Description section, and not the Summary and Abstract sections, is intended to be used to interpret the claims. The Summary and Abstract sections may set forth one or more but not all example embodiments of the present invention as contemplated by the inventors, and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the relevant art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by a person skilled in the relevant art in light of the teachings and guidance.

The breadth and scope of the present invention should not be limited by any of the above-described example embodiments, but should be defined only in accordance with the following claims and their equivalents.

What is claimed is:

1. A method comprising:
  receiving, at an external processing unit, speech from a user;
  processing the speech via an acoustic modeling process and a phoneme evaluation process;
  scoring Hidden Markov Models (HMMs) in association with the phoneme evaluation process by the following:
    receiving, at a co-processing unit, HMM information from an external processing unit, wherein the HMM information is derived from a plurality of HMMs, each HMM having a different type of data structure, wherein the different structures comprise Ergodic HMM structures, left-to-right structures, and parallel path left-to-right HMM structures;
    formatting, with the co-processing unit, the HMM information from each of the plurality of HMMs into a common HMM data structure to access the HMM information based on a priori knowledge of one or more fields and one or more indices in the common HMM data structure, wherein the formatting comprises formatting HMM information from at least one of a plurality of fields of the plurality of HMMs into the common HMM data structure;
    processing, with the co-processing unit, back pointer data and first HMM state scores for one or more NULL states in the common HMM data structure, each NULL state being a non-emitting state identified by a state-type flag;
    after processing the back pointer data and the first HMM state scores for each of the one or more NULL states in the common HMM data structure, processing, with the co-processing unit, second HMM state scores for one or more non-NULL states in the common HMM data structure based on at least one predecessor state;
    transferring the second HMM state scores from the co-processing unit to the external processing unit; and
  outputting, via the external processing unit, decoded speech based on the second HMM state scores.

2. The method of claim 1, further comprising:
  updating the back pointer data based on the HMM information associated with the one or more non-NULL states; and
  transferring the updated back pointer data to the external processing unit.

3. The method of claim 1, wherein the external processing unit comprises a memory device, and the receiving comprises receiving the HMM information via a single read access from the memory device.

4. The method of claim 1, wherein the formatting comprises formatting an HMM identification, a number of states associated with an HMM structure, a best score associated with the HMM structure, a state pointer for each of the one or more NULL and non-NULL states, an observation probability for each of the one or more non-NULL states, a path pointer for each of the one or more plurality of NULL states and one or more non-NULL states, and the state-type flag for each of the one or more plurality of NULL states and one or more non-NULL states, or a combination thereof for each of the plurality of HMMs into the common HMM data structure.

5. The method of claim 1, wherein the processing the back pointer data comprises updating the back pointer data with a back pointer of a predecessor state having the best incoming probability, wherein the best incoming probability is based on a state score and a transition probability associated with one or more predecessor states.

6. The method of claim 1, wherein the processing the second HMM state scores comprises summing a maximum value associated with one or more predecessor states and an observation probability associated with the one or more non-NULL states, wherein the maximum value is based on a state score and a transition probability associated with the one or more predecessor states.

7. The method of claim 1, wherein the processing the first HMM state scores comprises selecting a maximum value associated with one or more predecessor states, wherein the maximum value is based on a state score and a transition probability associated with the one or more predecessor states.

8. An apparatus comprising:
  an interface device configured to:
    receive Hidden Markov Model (HMM) information from an external processing unit, wherein the external processing unit is configured to receive speech from a user and further configured to process the speech via an acoustic modeling process and a phoneme evaluation process, wherein the HMM information is derived from a plurality of HMMs, each HMM having a different type of data structure, and wherein the different structures comprise Ergodic HMM structures, left-to-right structures, and parallel path left-to-right HMM structures; and format the HMM information from each of the plurality of HMMs into a common HMM data structure to access the HMM information based on a priori knowledge of one or more fields and one or more indices in the common HMM data structure wherein the formatting comprises formatting HMM information from at least one of a plurality of fields of the plurality of HMMs into the common HMM data structure;

a processing device comprising:
  a state type fetch module configured to determine a presence of one or more NULL and non-NULL states in the common HMM data structure, each NULL state being a non-emitting state identified by a state-type flag;
a processing module configured to:
  process back pointer data and first HMM state scores for the one or more NULL states;
  after back pointer data and first HMM state scores have been processed for each of the one or more NULL states, process second HMM state scores for one or more non-NULL states based on at least one predecessor state;
an output list module configured to transfer the second HMM state scores to the external processing unit, wherein the external processing unit outputs decoded speech based on the second HMM state scores; and
a memory device configured to store the HMM information.

9. The apparatus of claim 8, wherein the processing device comprises:
an input list module configured to provide the HMM information from the interface device to the state type module and the processing module.

10. The apparatus of claim 8, wherein the processing module is configured to:
update the back pointer data based on the HMM information associated with the one or more non-NULL states; and
transfer the updated back pointer data to the output list module.

11. The apparatus of claim 8, wherein the state type fetch module is configured to determine the presence of the NULL and non-NULL states in the HMM information based on the common HMM data structure comprising an HMM identification, a number of states associated with an HMM structure, a best score associated with the HMM structure, a state pointer for each of the NULL and non-NULL states, an observation probability for each of the one or more non-NULL states, a path pointer for each of the NULL and non-NULL states, and the state-type flag for each of the NULL and non-NULL states, or a combination thereof.

12. The apparatus of claim 8, wherein the processing module is configured to update the back pointer data with a back pointer of a predecessor state having the best incoming probability, wherein the best incoming probability is based on a state score and a transition probability associated with one or more predecessor states.

13. The apparatus of claim 8, wherein the processing module is configured to sum a maximum value associated with one or more predecessor states and an observation probability associated with the one or more non-NULL states, wherein the maximum value is based on a state score and a transition probability associated with the one or more predecessor states.

14. The apparatus of claim 8, wherein the processing module is configured to select a maximum value associated with one or more predecessor states, wherein the maximum value is based on a state score and a transition probability associated with the one or more predecessor states.

15. A tangible, non-transitory computer readable medium having stored therein one or more sequences of one or more instructions for execution by one or more processors to perform a method for processing a common Hidden Markov Model (HMM) data structure, the method comprising:
  receiving speech from a user;
  processing the speech via an acoustic modeling process and a phoneme evaluation process;
  scoring Hidden Markov Models (HMM) in association with the phoneme evaluation process by the following:
    receiving, at a co-processing unit, HMM information from an external processing unit, wherein the HMM information is derived from a plurality of HMMs, each HMM having a different type of data structure wherein the different structures comprise Ergodic HMM structures, left-to-right structures, and parallel path left-to-right HMM structures;
    formatting, with the co-processing unit, the HMM information from each of the plurality of HMMs into a common HMM data structure to access the HMM information based on a priori knowledge of one or more fields and one or more indices in the common HMM data structure, wherein the formatting comprises formatting HMM information from at least one of a plurality of fields of the plurality of HMMs into the common HMM data structure;
    processing, with the co-processing unit, back pointer data and first HMM state scores for NULL states in the common HMM data structure, each NULL state being a non-emitting state identified by a state-type flag;
    after processing the back pointer data and the first HMM state scores for each of the NULL states, processing, with the co-processing unit, second HMM state scores for one or more non-NULL states in the common HMM data structure based on at least one predecessor state;
    transferring the second HMM state scores from the co-processing unit to the external processing unit; and
  outputting decoded speech based on the second HMM state scores.

16. The tangible, non-transitory computer readable medium of claim 15, wherein the method further comprises:
updating the back pointer data based on the HMM information associated with the one or more non-NULL states; and
transferring the updated back pointer data to the external processing unit.

17. The tangible, non-transitory computer readable medium of claim 15, wherein the external processing unit comprises a memory device, and the receiving comprises receiving the HMM information via a single read access from the memory device.

18. The tangible, non-transitory computer readable medium of claim 15, wherein the formatting comprises formatting an HMM identification, a number of states associated with an HMM structure, a best score associated with the HMM structure, a state pointer for each of the NULL and non-NULL states, an observation probability for each of the one or more non-NULL states, a path pointer for each of the NULL and non-NULL states, and the state-type flag for each of the NULL and non-NULL states, or a combination thereof for each of the plurality of HMMs into the common HMM data structure.

19. The method of claim 1, wherein the formatting further comprises:
   accessing the HUM information in the common HMM data structure based on byte index locations for each of the one or more fields in the common HMM data structure.

* * * * *